United States Patent [19]

Weaver et al.

[11] Patent Number: 5,254,625
[45] Date of Patent: Oct. 19, 1993

[54] LIGHT-ABSORBING POLYMERS

[75] Inventors: Max A. Weaver; James J. Krutak; Clarence A. Coates; Wayne P. Pruett, all of Kingsport; Samuel D. Hilbert, Jonesborough, all of Tenn.

[73] Assignee: Eastman Kodak Company, Rochester, N.Y.

[21] Appl. No.: 888,940

[22] Filed: May 26, 1992

Related U.S. Application Data

[63] Continuation of Ser. No. 711,774, Jun. 7, 1991, abandoned.

[51] Int. Cl.$^5$ .............. C08L 65/00; C08L 67/00; C08L 23/00; C08G 10/00
[52] U.S. Cl. ............................ 525/165; 525/166; 525/185; 525/186; 525/398; 525/434; 525/435; 525/466; 525/467; 525/432; 528/230; 528/266; 528/267; 528/271
[58] Field of Search ............. 528/230, 266, 267, 271; 525/165, 166, 185, 186, 398, 343, 435, 466, 467, 432

[56] References Cited

U.S. PATENT DOCUMENTS 4,622,170 11/1986 Wynne et al. .................. 428/364

FOREIGN PATENT DOCUMENTS 1316288 5/1973 United Kingdom .

OTHER PUBLICATIONS

Stenger-Smith et al. in Polymer Preprints, 31, pp. 375-376, Apr. 1990.
Green et al. in Polymer Preprints 28, pp. 207-208, Apr. 1987.

Primary Examiner—John Kight, III
Assistant Examiner—Jeffrey C. Mullis
Attorney, Agent, or Firm—Bernard J. Graves, Jr.; William P. Heath, Jr.

[57] ABSTRACT

Provided are polymers containing methine linkages. Also provided are shaped or formed articles comprised of the light absorbing polymers either alone or admixed with other thermoplastic polymers to form a light absorbing thermoplastic polymer composition.

9 Claims, No Drawings

LIGHT-ABSORBING POLYMERS

This is a continuation application of copending application Ser. No. 07/711,774 filed on Jun. 7, 1991, now abandoned.

FIELD OF THE INVENTION

This invention belongs to the field of polymer chemistry. More particularly, this invention relates to light absorbing polymers containing methine linkages and to thermoplastic polymers to which said light absorbing polymers have been added.

BACKGROUND OF THE INVENTION

It is well known, of course, to color thermoplastic polymeric compositions using pigments and soluble dyes. (See, for example, *Coloring of Plastics*, T. G. Weber, ed., John Wiley & Sons, New York, 1979.) Plastics colored with pigments are usually opaque and may lack brilliance of color afforded by soluble dyes. Use of pigments is also often accompanied by problems in storage, blending, uniformity, etc. Some of the deficiencies encountered in the use of pigments can be overcome by use of soluble dyes which give improved clarity and brilliance, but this approach often results in migration and problems related to solvent extraction of the dye from the thermoplastic resins. Some improvement in solvent extraction and migration properties has been achieved by incorporating poly(oxyalkylene) polymer units into colorants. (See U.S. Pat. No. 4,640,690). These colorants have the disadvantage, however, of having a significant portion of their weight consisting of non-colored polymeric composition. U.S. Pat. No. 4,116,923 teaches the incorporation of reactive colorants into cross linked polyester resins and the use of these colored polyester resins in coloring thermoplastic polymers such as polyolefins. Here again, a major portion of the colored polyester resin used to color the polyolefins is "non colored", and thus results in lower tinctorial strength. Further, it is known that one may improve the nonextractability of colorants and UV absorbers in thermoplastic polyesters by copolymerizing thermally stable colorants into the backbone of the polyester composition. (See U.S. Pat. Nos. 4,617,373; 4,617,374; and 4,707,537. This method suffers from the difficulty in finding non volatile, very reactive colorants which will not be lost by volatilization or decomposition during the stages of ester interchange and polycondensation of the polyester preparation.

It is also known that one may color thermoplastic polymeric materials using color concentrates consisting of physical admixtures of polymers and colorants. However, the use of such physical admixtures to color polymeric materials such as polyesters, e.g., poly(ethylene terephthalate) and blends thereof, presents a number of problems:
1. Colorant migration during drying of the colored polymer pellets.
2. Colorant migration during extrusion and colorant accumulation on dies which can cause film rupture and shut downs for clean up, etc. Such colorant migration and accumulation result in time consuming and difficult clean up when a polymer of another color is subsequently processed in the same equipment.
3. Colorants may not mix well, for example, when using two or more color concentrates to obtain a particular shade.
4. Colorants may diffuse or exude during storage of the colored polymeric material.

SUMMARY OF THE INVENTION

This invention relates to polymeric light absorbing compounds which contain methine linkages. The compounds are thermally stable and are useful in imparting UV and/or visible light absorbing properties to a variety of polymeric substrates, particularly thermoplastic polymers. Their low volatility allows them to be added during high temperature polymerizations such as is encountered in preparation of polyesters or in subsequent melt blending with polymeric substrates. The polymeric compounds are less volatile and less extractable from the thermoplastic polymers than ar typical monomeric colorants and UV absorbers.

This invention relates to polymeric light absorbing compounds described by Formula (I)

$$-A=HC-B-_n \qquad (I)$$

and thermoplastic resin compositions to which (I) has been incorporated to impart UV and visible light absorbing properties; wherein A is the residue of an organic active methylene group and B is a divalent organic moiety which contains at least one carbocyclic or heterocyclic aromatic ring bonded directly to the methylidine moiety; and wherein n is an integer of at least 2.

Compounds of Formula (I) are useful in imparting light absorbing properties to polymeric substrates, particularly thermoplastic polymers. Their excellent thermal stability allows them to be added during preparation of the polymer or to be melt blended with the polymeric substrates. The polymeric compounds are less volatile and less extractable from the thermoplastic polymers than are the typical monomeric colorants, thus rendering the polymeric compositions useful for packaging materials, coatings, cosmetics, and home care products where nonexposure to humans is desirable.

DETAILED DESCRIPTION OF THE INVENTION

Plastics, paints, printing inks, rubber, cosmetics, e.g., lipsticks, etc., are usually colored by organic colorants when superior brilliance and tinctorial strength are advantageous. Toxicity has been a chronic problem related to the use of these materials as some have been shown to be potential carcinogens and to cause contact dermatitis, for example. Recent publications document the continued concern. (See, for example, Federal Register, Jul. 15, 1988 and *ACTA Derm Venerol.*, Suppl., 1987, 134, pp. 95-97.) Plastics usually consist of large macromolecules and other ingredients such as fillers, plasticizers, colorants, etc. Most polymers do not produce allergic reactions by themselves, but leachable additives are known to cause contact dermatitis. (S. Fregert, *Manual of Contact Dermatitis*, Munkgard, Denmark, 2nd Ed. 1981.)

The overall purpose of this invention is to provide colorants and UV absorbers which can be incorporated into thermoplastic polymeric compositions wherein the light absorbing compounds are thermally stable, have low extractability, volatility, sublimation, and which do not exude from the polymeric substrate. These polymeric compositions containing the light absorbing properties are useful as packaging materials, films, fibers, etc., since exposure to toxic molecules readily absorbed by the body is greatly minimized. Of course, when visible light is absorbed the polymeric compositions are colored. The presence of UV light absorbing compounds in polymeric compositions provides protection from harmful UV light rays for products packaged or contained therein and provides increased stabilization of the polymer itself to sunlight.

The present invention provides a polymer represented by Formula (I)

         (I)

wherein active methylene residues (A) are selected from the formulae:

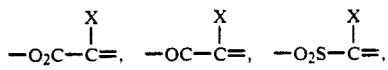

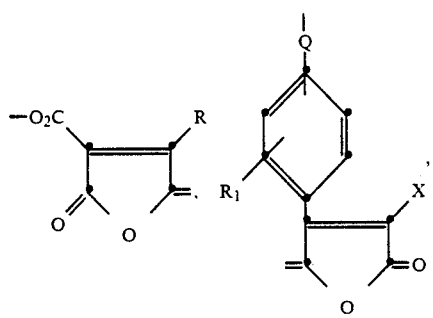

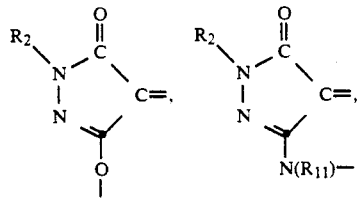

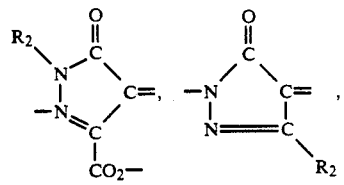

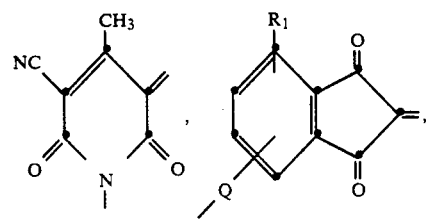

-continued

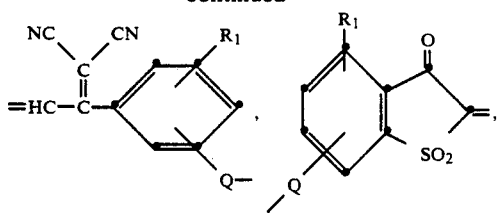

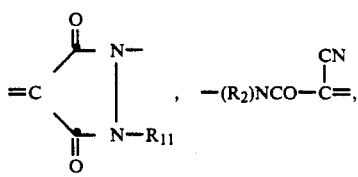

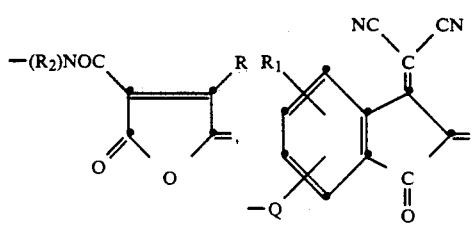

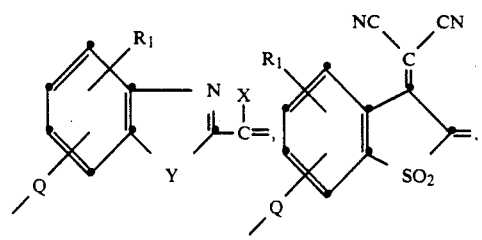

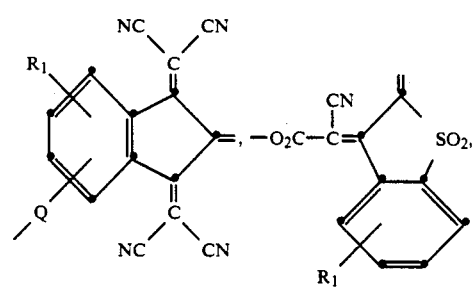

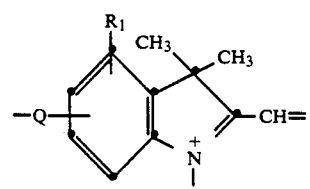

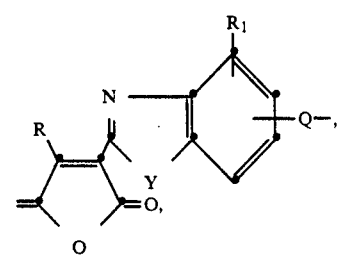

-continued

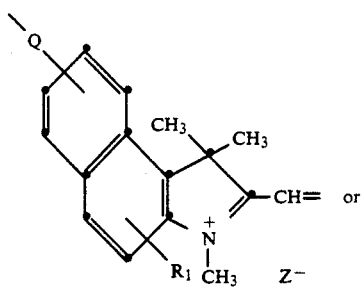

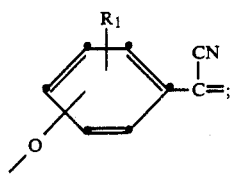

wherein Q is selected from a covalent bond, $-CO_2-$, $-CO-$, $-S-$, $-O-$, $-SO_2-$, $-CON(R_2)-$, $-N(SO_2R_3)-$ or $-SO_2N(R_2)-$;

X is selected from cyano; unsubstituted and substituted carboxylic acid ester; unsubstituted and substituted carbamoyl; unsubstituted or substituted alkylsulfonyl; $C_3$-$C_8$ cycloalkylsulfonyl; or arylsulfonyl or unsubstituted or substituted carbocyclic or heterocyclic aryl;

Y is selected from $-O-$, $-S-$, $-NH-$ or substituted imino;

Z is a counter anion;

R is hydrogen, lower alkyl, or unsubstituted or substituted carbocyclic or heterocyclic aryl;

$R_1$ is selected from hydrogen or 1-2 groups selected from lower alkyl, lower alkoxy or halogen;

$R_2$ is selected from hydrogen, unsubstituted or substituted lower alkyl, $C_3$-$C_8$ cycloalkyl or unsubstituted or substituted carbocyclic or heterocyclic aryl;

$R_2'$ is selected from $-OR_3$, $NHR_3$ or one of the groups listed for $R_2$, $R_3$ is unsubstituted or substituted alkyl; $C_3$-$C_8$ cycloalkyl or unsubstituted carbocyclic or heterocyclic aryl;

and wherein the divalent moiety B is represented by one of the following formulae:

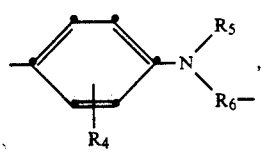

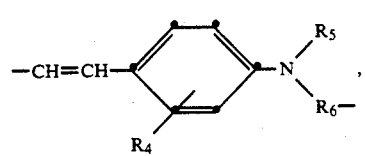

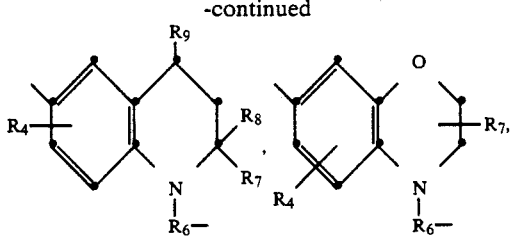

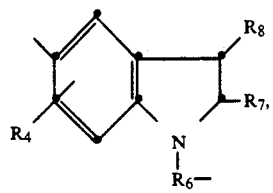

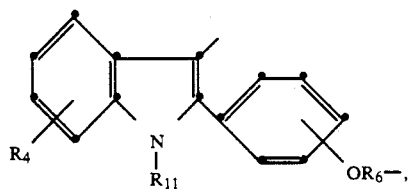

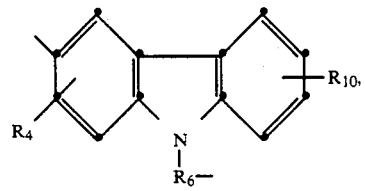

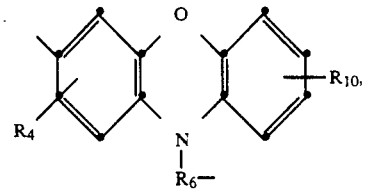

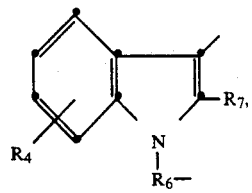

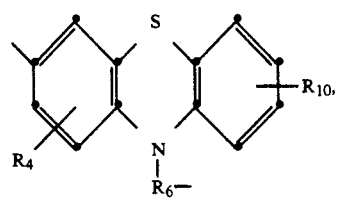

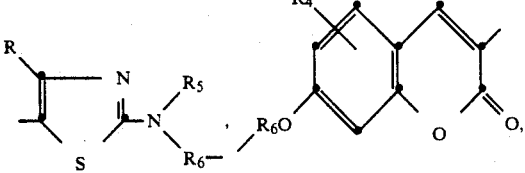

-continued

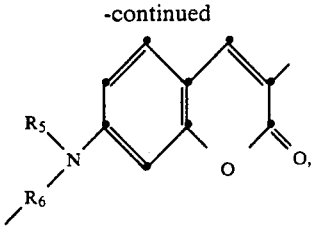

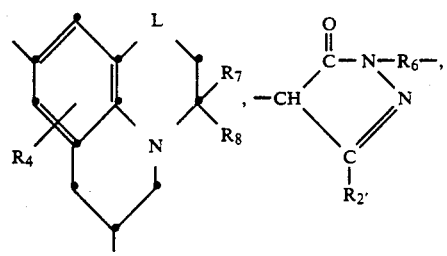

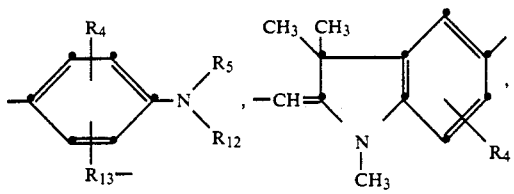

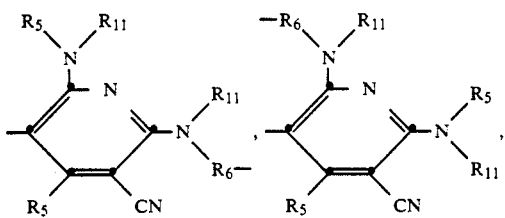

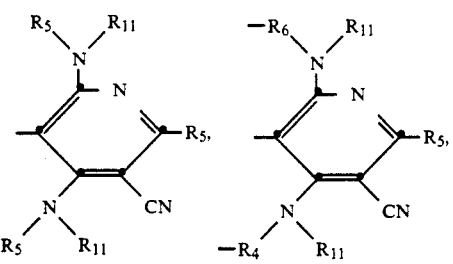

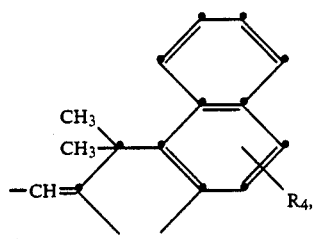

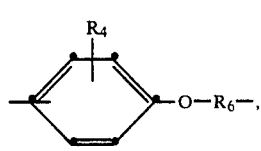

-continued

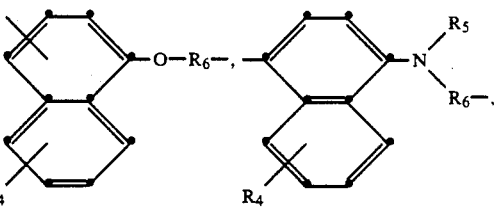

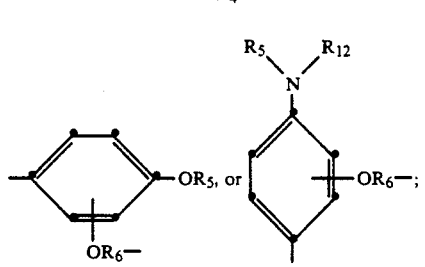

wherein $R_4$ and $R_{10}$ are hydrogen or 1-2 substituents selected from lower alkyl, lower alkoxy or halogen;

$R_5$ and $R_{12}$ are selected from unsubstituted lower alkyl, lower alkenyl, lower alkynyl, $C_3$-$C_8$ cycloalkyl, or phenyl and substituted lower alkyl, $C_3$-$C_8$ cycloalkyl and phenyl;

$R_6$ is selected from unsubstituted or substituted lower alkylene, $C_3$-$C_8$ cycloalkylene, phenylene, alkylene-phenylenealkylene, alkylene-($C_3$-$C_8$)cycloalkylene-alkylene, alkylene-O-alkylene, alkylene-S-alkylene, alkylene-$SO_2$-alkylene, alkylene-O-phenylene-O-alkylene, alkylene-N($SO_2R_3$)alkylene or alkylene-phenylene;

$R_7$, $R_8$, $R_9$ are hydrogen or alkyl;

$R_{11}$ is hydrogen, lower alkyl or aryl;

$R_{13}$ is selected from lower alkylene, —O—$R_6$— or —N($SO_2R_3$)—$R_6$—;

L is selected from a direct bond, —O—, —$CH_2$— or —CH($CH_3$)—; and n is an integer of from 2 to about 40.

Of course, as will be appreciated by those skilled in the art, the polymers of Formula (I) are terminated with an aldehyde or active methylene group present on the starting monomer.

In a preferred embodiment of the invention, in the polymers represented by repeating units of Formula (I) above the active methylene moiety A has the structure —$O_2C$—C(CN)= and B is selected from the following formulae:

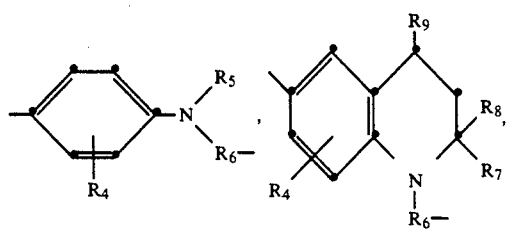

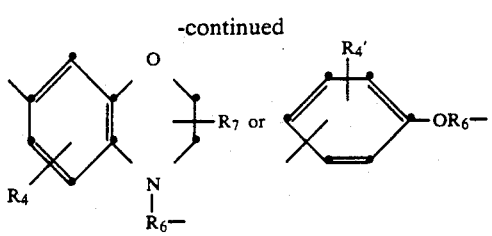

wherein $R_4$, $R_7$, $R_8$, and $R_9$ are as defined above; $R_4'$ is selected from hydrogen or alkoxy;

$R_5$ is selected from the following groups: lower alkenyl; cycloalkyl; cycloalkyl substituted with one or two of lower alkyl, lower alkoxy or halogen; phenyl and phenyl substituted with one or two of lower alkyl, lower alkoxy, alkoxycarbonyl, halogen, alkanoylamino, cyano, nitro or alkylsulfonyl; straight or branched chain alkyl of 1-8 carbons and such alkyl groups substituted with one or more of the following: cycloalkyl and cycloalkyl substituted with one or two of lower alkyl, lower alkoxy or halogen; phenyl and phenyl substituted with one or two of lower alkyl, lower alkoxy, alkoxycarbonyl, halogen, alkanoylamino, cyano, nitro or alkylsulfonyl; cyano; halogen; 2-pyrrolidino; phthalimidino; vinylsulfonyl; acrylamido; o-benzoic sulfimido; alkoxy; alkoxyalkyl; cyanoalkoxy; phenoxy; phenoxy substituted with lower alkyl, lower alkoxy, or halogen; groups of the formulae:

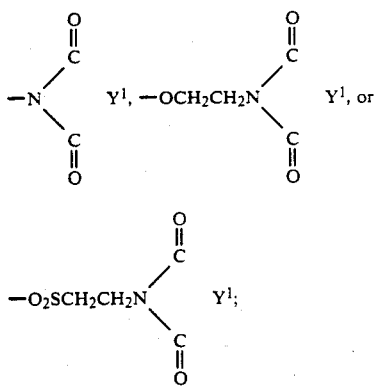

wherein $Y^1$ is selected from o-phenylene; o-phenylene substituted with lower alkyl, lower alkoxy, halogen or nitro; $-O-CH_2-$; $-OCH_2CH_2-$; $-CH_2OCH_2-$; $-S-CH_2-$; $-CH_2SCH_2-$; $-NHCH_2-$; $-NHCH_2CH_2-$; $-N(alkyl)CH_2-$; $-N(alkyl)CH_2CH_2-$ or $-NHC(C_6H_5)_2-$; groups of the formulae:

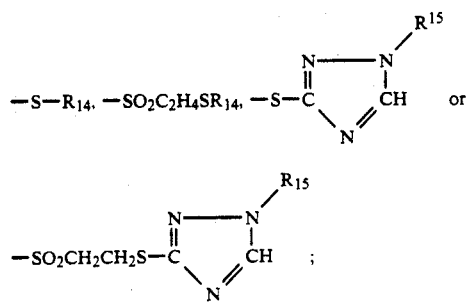

wherein $R_{14}$ is selected from lower alkyl; cycloalkyl; phenyl; phenyl substituted with one or more groups selected from lower alkyl, lower alkoxy or halogen; pyridyl; pyrimidinyl; benzoxazolyl; benzothiazolyl; benzimidazolyl; 1,3,4-thiadiazolyl, 1,3,4-oxadiazolyl; these heterocyclic radicals substituted with one or more groups selected from lower alkyl, lower alkoxy or halogen; wherein $R_{15}$ is selected from hydrogen, lower alkyl or benzyl; groups of the formulae:

$-SO_2R_{16}$; $-SO_2N(R_{17})R_{18}$; $-CON(R_{17})R_{18}$; and $N(R_{17})COR_{18}$;

wherein $R_{16}$ is selected from cycloalkyl; cycloalkyl substituted with alkyl; allyl; phenyl; phenyl substituted with one or two groups selected from lower alkyl, lower alkoxy or halogen; lower alkyl; lower alkyl substituted with one or more groups selected from lower alkoxy, halogen, cyano, cycloalkyl, phenyl, phenoxy, alkylthio or alkylsulfonyl;

$R_{17}$ and $R_{18}$ are each independently selected from hydrogen or those groups represented by $R_{16}$;

$R_6$ is selected from lower alkylene, alkylene-O-alkylene or alkylene-S-alkylene; and $R_4'$ is hydrogen or lower alkoxy.

The terms "substituted alkyl" and "substituted alkylene" preferably refer to an alkyl group and an alkylene group, respectively, substituted by one or more halogen, phenyl, phenoxy, $C_1-C_4$ alkanoyloxy, hydroxy, amino, $C_1-C_6$ alkoxycarbonyl, nitro, carboxy, $C_1-C_6$ alkylsulfonyl, cyclohexyl, carbamoyl, cyano, $C_1-C_6$ alkylsulfonylamino or $C_1-C_4$ alkoxy groups. The substituted alkyl groups may be substituted one or more times with the same or with different substituents. Preferably, the alkyl portion contains from one to ten carbon atoms, most preferably from one to six carbon atoms.

Examples of the above substituted alkyl groups include cyanoethyl, nitroethyl, hydroxymethyl, trityloxymethyl, propionyloxyethyl, aminomethyl, carboxymethyl, allyloxycarbonylmethyl, allyloxy-carbonylaminoethyl, carbamoyloxyethyl, methoxyethyl, ethoxyethyl, t-butoxybutyl, acetoxyethyl, chloromethyl, bromohexyl, iodomethyl, 6-hydroxyhexyl, 2,4-dichloro(n-butyl), 2-amino(iso-propyl), 2-carbamoyloxyethyl, chloroethyl, bromoethyl, fluoroethyl, iodoethyl, chloropropyl, bromopropyl, fluoropropyl, iodopropyl, and the like.

The term "aryl" as used herein refers to heterocyclic aryl rings and carbocyclic aryl rings. For example, aryl can be phenyl, naphthyl, phenanthryl, and the like. Aryl can also be 5 or 6-membered heterocyclic aryl rings containing one oxygen atom, and/or one sulfur atom, and up to three nitrogen atoms, said heterocyclic aryl ring optionally fused to one or two phenyl rings. Examples of such ring systems include thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatriazolyl, oxatriazolyl, pyridyl, pyrimidyl, pyrazinyl, pyridazinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, 1,5-b]pyridazinyl and purinyl, benzoxazolyl, benzothiazolyl, benzimidazolyl, indolyl and the like.

Accordingly, the term "substituted aryl" preferably refers to such aryl rings substituted by one or more halogen, phenoxy, phenyl, hydroxy, amino, $C_1-C_6$ alkoxycarbonyl, nitro, alkylsulfonyl, carboxy, cyclohexyl, carbamoyl, cyano, $C_1-C_6$ alkylsulfonylamino or $C_1-C_6$ alkoxy groups.

The term alkoxycarbonyl preferably refers to an $C_1$-$C_6$ alkoxy group bonded to a carbonyl function. In other words, the $C_2$ alkoxycarbonyl group is ethoxycarbonyl. The term substituted alkoxycarbonyl refers to an $C_1$-$C_6$ alkoxycarbonyl group substituted with one or more halogen, phenyl, phenoxy, hydroxy, amino, $C_1$-$C_6$ alkoxycarbonyl, nitro, carboxy, cyclohexyl, carbamoyl, cyano, $C_1$-$C_6$ alkylsulfonylamino, or $C_1$-$C_6$ alkoxy groups.

The terms "alkyl" and "alkylene" as used herein preferably refer to $C_1$-$C_{12}$ straight or branched chain alkyl and alkylene groups respectively. The terms "lower alkyl", and "lower alkylene" preferably refer to a $C_1$-$C_6$ straight or branched chain alkyl and alkylene group, respectively. The terms "lower alkenyl" and "lower alkynyl" refer to $C_3$-$C_6$ alkenyl groups and $C_3$-$C_6$ alkynyl groups, respectively.

The term "unsubstituted and substituted carboxylic acid ester" preferably refers to $C_1$-$C_8$ alkyl, $C_3$-$C_8$ cycloalkyl or aryl oxycarbonyl group, preferably containing from 2 to 10 carbon atoms and optionally substituted with halogen, $C_1$-$C_6$-alkoxy, $C_3$-$C_8$ cycloalkyl, aryl, aryloxy, $C_1$-$C_6$-alkyl, cyano, $C_1$-$C_6$ alkanoyloxy, hydroxy or $C_1$-$C_6$ alkoxycarbonyl.

The term "unsubstituted and substituted carbamoyl" refers to an alkyl (or substituted alkyl) amino carbonyl group, preferably containing from 2 to 10 carbon atoms.

The term "substituted imino" refers to an imino group substituted with a group selected from hydrogen, $C_1$-$C_6$ alkyl, $C_3$-$C_8$ cycloalkyl or aryl.

The term "$Z^-$" refers to any counter anion. Preferably, $Z^-$ is selected from $Br^-$, $Cl^-$, $I^-$, $CH_3SO_4^-$, or $ZnCl_4^=/2$.

Light absorbing polyesters of Formula (I) can be prepared by self condensation of a "monomeric" compound containing an aromatic aldehyde group and an active methylene moiety under Knoevenagel reaction conditions using a basic catalyst. Typical monomers useful in the practice of the invention include the following:

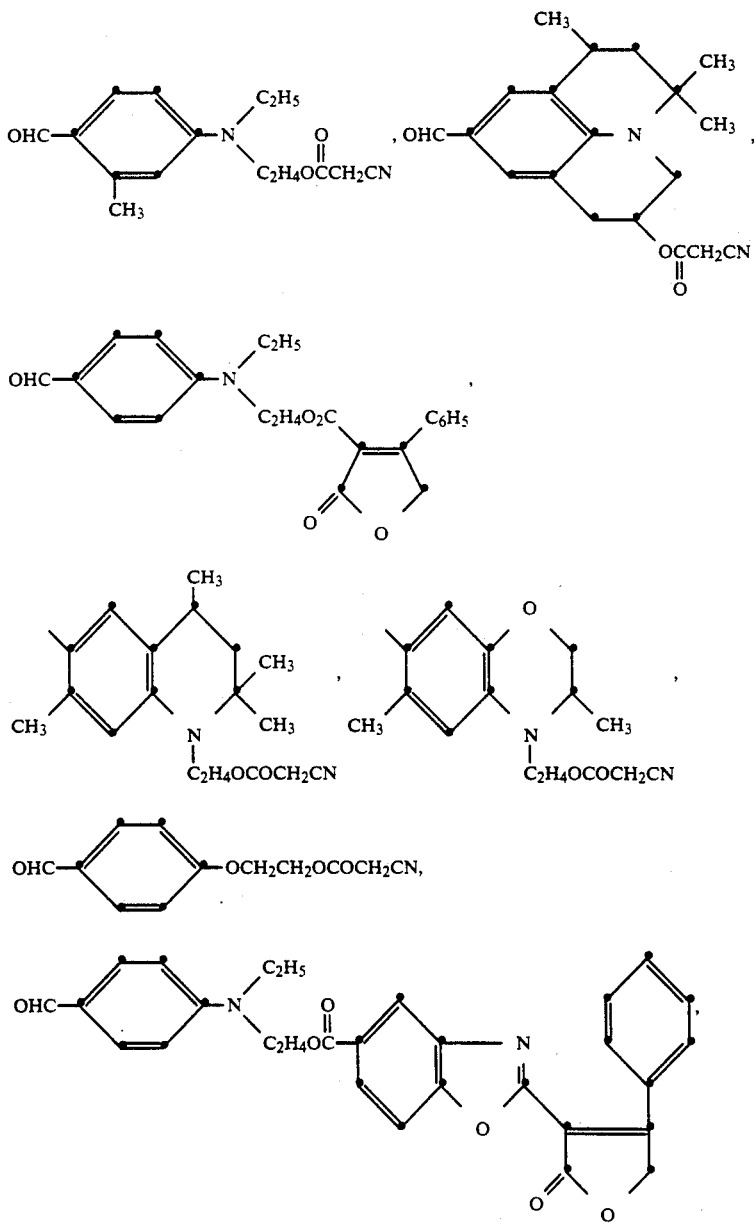

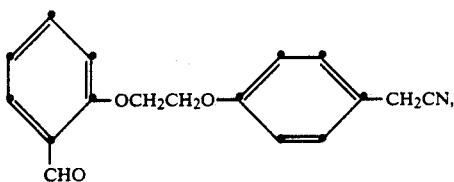

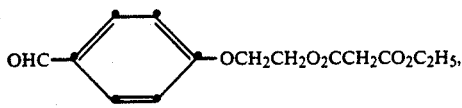

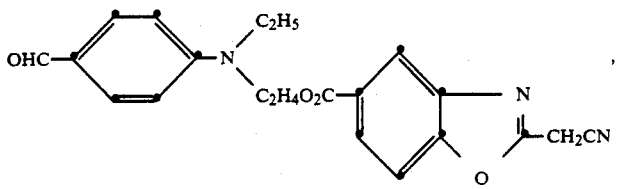

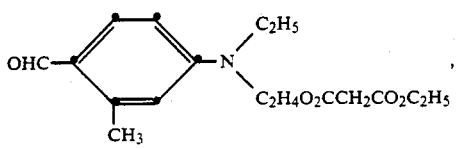

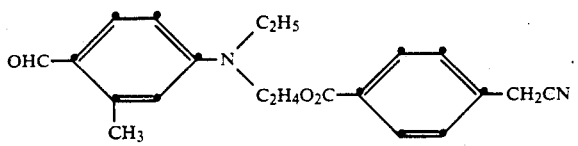

The polymeric light absorbing Compounds I may be prepared by three general Routes I, II, and III. In Route I, an aromatic aldehyde compound which contains a reactive group (e.g. hydroxy) is reacted with an active methylene compound which has a reactive group (e.g., an ester) to produce an intermediate which contains an aldehyde group and active methylene group in the same molecule. Polymerization is then brought about by a basic catalyst.

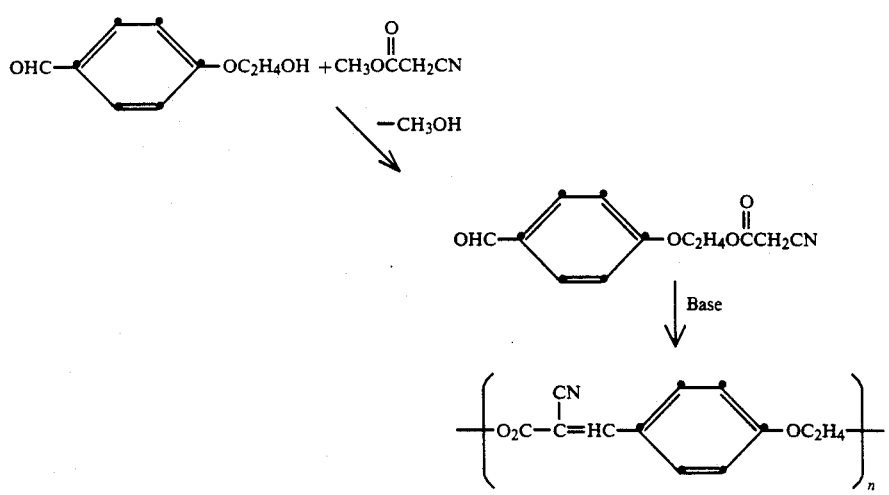

or

ROUTE I

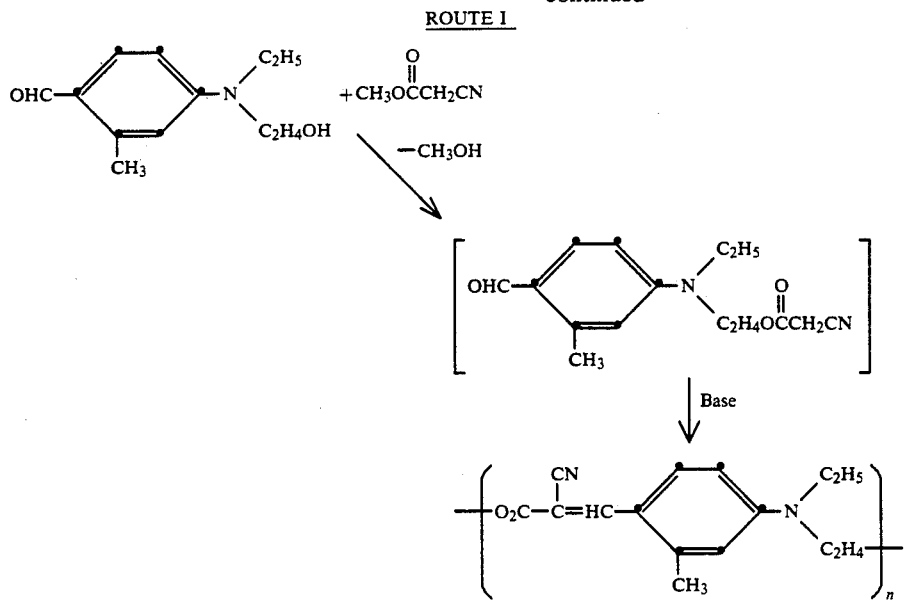

Usually, the intermediate monomer, which contains both the aldehyde and active methylene groups, is not isolated but is treated with base to facilitate the Knoevenagel type condensation. Bases such as piperidine, piperidine acetate, sodium acetate and pyridine are effective catalysts. Solvents such as alcohols, glycol ethers, N,N-dimethylformamide, N,N-dimethylacetamide and N-methyl-2-pyrrolidinone are convenient. Sometimes with the active methylenes of lesser reactivity, completion of the reaction may be facilitated by use of solvent or co solvent such as refluxing benzene, toluene or xylene, whereby the water thus formed can be removed azeotropically as it is produced.

In Route II, an aromatic aldehyde which contains an additional reactive group can be reacted with an active methylene compound which contains an additional reactive group. The intermediate methine compound itself serves as a "monomer" and is self condensed to yield the polymer. For example, when the additional reactive

ROUTE II

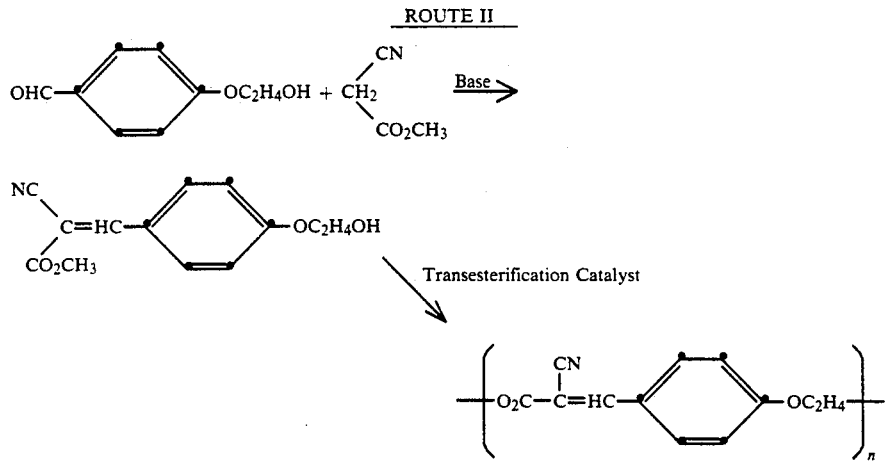

groups are hydroxy and carboxy or carboxylate, a polymer can be produced under esterification or transesterification conditions. In Route III, an aromatic amine compound which contains a reactive group is reacted with an active methylene compound containing a reactive group to give an intermediate which will undergo the Vilsmeier-Haack reaction to introduce an aldehyde group. Treatment of the bi-functional intermediate with base facilitates the Knoevenagel type condensation to produce the light absorbing polymer.

ROUTE III

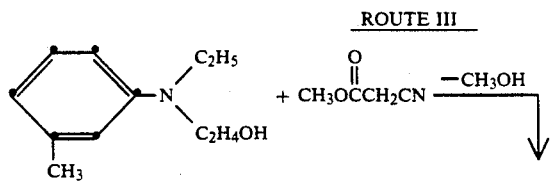

ROUTE III

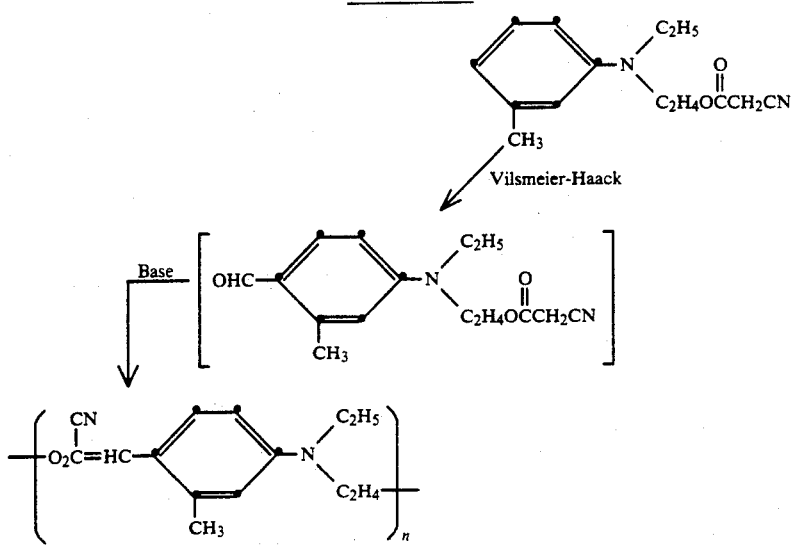

As in Route I, the intermediates which contain the aldehydes and active methylene groups are not usually isolated but treated with base to facilitate the Knoevenagel type condensation.

The novel light-absorbing concentrates an their preparation are further illustrated by the experimental section below. The inherent viscosities specified herein are determined at 25° C. using 0.5 g of polymer per 100 mL of a solvent consisting of 60 weight percent phenol and 40 weight percent tetrachloroethane. The weight average molecular weight (Mw) and number average molecular weight value referred to herein are determined by gel permeation chromatography. The melting temperatures are determined by differential scanning calorimetry on the first and/or second heating cycle at a scanning rate of 20° C. per minute and are reported as the peaks of the transitions.

Thermoplastic resins colored by compounds of Formula (I) are characterized by good clarity and brilliance in contrast to compositions colored by the use of insoluble pigments. Compounds of Formula (I) have excellent light absorbing properties since they are truly "homopolymeric" in contrast to some of the known colorant compositions which have colorants attached to polymeric moieties which decrease the color yield when these colorant compositions are used to color thermoplastics polymers. Some of the compounds of Formula (I) absorb light in the visible spectrum, others in the ultraviolet spectrum, and others in both.

The amount of light absorbing polymer added to the thermoplastic resin varies depending upon the end use and desired degree of light absorption, but in general is from about 0.001% to about 5% by weight.

The thermoplastic resin systems useful for blending with the light absorbing concentrates of the present invention include polyesters such as poly(ethylene terephthalate); polyamides such as nylon 6 and nylon 66; polyolefins, e.g., polyethylene, polypropylene, polybutylene and copolymers made from ethylene, propylene or butylene. Other thermoplastic polymers include cellulosic resins such as cellulose acetate, cellulose propionate, or cellulose butyrate; acrylic resins such as polymethyl methacrylate; polycarbonates; polystyrene; polyacrylonitrile; polyvinylidene chloride; polyvinyl chloride, etc.

The following Experimental Section is provided to further illustrate the invention but should not be construed as limiting the scope thereof.

EXPERIMENTAL SECTION

EXAMPLE 1

Preparation of Polymeric UV Light Absorbing Compound

A mixture of 4-(2-hydroxyethoxy)-3-methoxybenzaldehyde (1.96 g, 0.01 m), methyl cyanacetate (0.99 g, 0.01 m) and N,N-dimethylformamide (15 g) is heated to 140° C. and then cooled to <100° C. Toluene (15 g) and 0.5 mL of an n butanol solution of titanium isopropoxide which contains 0.0128 g Ti/mL are added. The reaction mixture is refluxed for eight hours under a Dean-Stark trap filled with toluene and then allowed to cool. The pale yellow polymeric product which crystallizes is collected by filtration, washed with methanol, and dried in air. A yield of 1.2 g of product is obtained which has an absorption maximum ($\lambda$max) in the UV absorption spectrum at 364 nm in trifluoroacetic acid solvent.

The proposed structure is as follows:

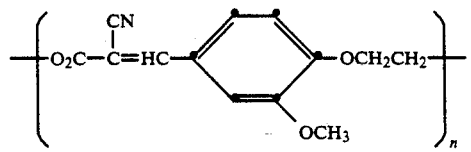

$\lambda$max — 364 nm (CF$_3$COOH)

The polymer has a weight average molecular weight of 4,563, a number average molecular weight of 3,600 and a polydispersity index of 1.27.

EXAMPLE 2

Preparation of N-ethyl-N-[[2(α-cyano) acetyloxy]ethyl]-3-methylaniline

A mixture of N-ethyl-N-(2-hydroxyethyl)-3-methylaniline (89.6 g, 0.50 m), cyanoacetic acid (85.0 g, 1.0 m), toluene (300 mL) and p-toluenesulfonic acid (0.2 g) is heated and stirred in a flask equipped with a Dean Stark trap filled with toluene for two hours and the water removed as it is formed. The cooled reaction solution is extracted with 150 mL of water containing 10 mL of conc. NH₄OH and then with 3-150 mL portions of water. The toluene layer is then dried over sodium sulfate. Toluene is removed under reduced pressure to yield 99.5 g (80.9% of the theoretical yield of oily product having the following structure:

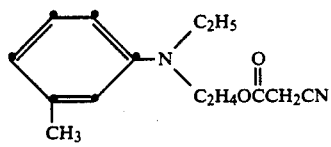

EXAMPLE 3

Preparation of Polymeric Methine Yellow Colorant

The intermediate aniline compound from Example 2 (24.6 g, 0.10 m) is dissolved in N,N-dimethylformamide (40 mL) and the solution cooled. Phosphorous oxychloride (15.3 g) is added dropwise at 10°-15° C. with stirring and then the reaction mixture is heated at 90°-95° C. for 2.5 hr, during which time a yellow color develops. The reaction mixture is allowed to cool and added to a stirred mixture of ethanol (300 mL), sodium acetate (50 g) and piperidine (3 mL). Heat is applied and the mixture is refluxed for about one hour. It is cooled and then drowned onto ice water mixture. The somewhat sticky yellow product is washed with water by decantation. A solid polymeric yellow colorant is produced by slurrying in ethanol, filtering, washing with ethanol and drying in air (yield 8.6 g). The polymer has an I.V. of 0.085, a weight average molecular weight of 3,129, a number average molecular weight of 2,499, a polydispersity index of 1.25, a melting temperature Tm of 177° C. and a glass transition temperature Tg of 77° C. The proposed structure is as follows:

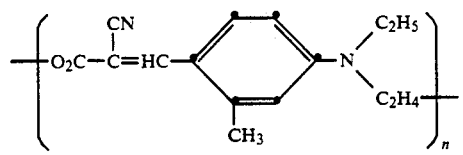

$\lambda_{max}$ — 442 nm (CH₂Cl₂)   Polymeric Yellow Colorant

The polymeric yellow colorant has an absorption maximum ($\lambda$ max) at 442 nm in methylene chloride.

EXAMPLE 4

The following materials are placed in a 500 mL three necked, round bottom flask:
- 97 g (0.5 mol) dimethyl terephthalate
- 62 g (1.0 mol) ethylene glycol
- 0.00192 g Ti from a n-butanol solution of acetyltriisopropyl titanate
- 0.0053 g Mn from an ethylene glycol solution of manganes acetate
- 0.0345 g antimony trioxide
- 0.0072 g Co from an ethylene glycol solution of cobaltous acetate
- 0.0384 g polymeric UV absorber of Example 1 (400 ppm)

The flask is equipped with a nitrogen inlet, stirrer, vacuum outlet, and condensing flask. The flask and contents are heated at 200° C. in a Belmont metal bath for 60 minutes and at 210° C. for 75 minutes with a nitrogen sweep over the reaction mixture. Then, 1.57 mL of an ethylene glycol slurry of a mixed phosphorous ester composition (Zonyl A) which contains 0.012 g phosphorous is added. The temperature of the bath is increased to 230° C. and a vacuum with a slow stream of nitrogen blending in the system is applied over a five minute period until the pressure has been reduced to about 200 mm Hg. The flask and contents are heated at about 230° C. under a pressure of about 200 mm Hg for 25 minutes. The metal bath temperature is then increased to about 270° C. At 270° C., the pressure is slowly reduced to about 100 mm Hg and the flask and contents heated at about 270° C. for 30 minutes. The metal bath temperature is increased to 285° C. and the pressure is reduced slowly to 4.5 mm Hg. The flask and contents are heated at 285° C. under pressure of 4.5 mm Hg for 25 minutes. Then the pressure is reduced to 0.25 mm Hg and polycondensation is continued for 40 minutes. The flask is removed from the metal bath and is allowed to cool in a nitrogen atmosphere while the polymer crystallizes. The resulting polymer has an inherent viscosity of 0.60 as measured in a 60/40 ratio by weight of phenol/tetrachloroethane at a concentration of 0.5 g per 100 mL. An amorphous 13.5-mil thick film molded from this polymer to simulate the sidewall of a container transmits less than 10% light from 250 to about 375 nm, whereas a 13.5-mil film prepared from a like polyester Without the absorber transmits greater than 10% light at all wave lengths above 320 nm. No loss of UV absorber during the polymerization by volatilization is observed.

EXAMPLE 5

The procedure of Example 4 is repeated except the polymeric UV absorber is added at 230° C. after the ester interchange step to produce a polyester composition which has similar UV light absorbing properties to that of Example 4.

EXAMPLE 6

Poly(ethylene terephthalate), (Eastman PET 7352) (400 g) is granulated using a Wiley mill thru a 2 mm screen and then blended with the polymeric UV absorber of Example 1 (400 ppm) and ethylene glycol (3 g). This blend is dried in a vacuum oven at 110° C. for 16 hours. A 15 mil film is prepared on a C. W. Brabender ¾ in. extruder at 280° C. The UV absorbing properties of this film are similar to those prepared from the polymers of Examples 4 and 5.

EXAMPLE 7

The procedure of Example 4 is repeated using 0.0192 g (200 ppm) of the polymeric yellow colorant of Example 3. An amorphous 14 mil thick film is molded from this polymer which has an inherent viscosity of 0.56. In the absorption spectrum of the film, a maximum absorbance is observed at 439 nm which indicates good thermal stability of the yellow colorant. No loss of colorant is observed during the polymerization reaction by volatilization.

EXAMPLE 8

Poly(ethylene terephthalate) (Eastman PET 7352) (400 g) is granulated using a Wiley mill thru a 2 mm screen and then blended with the colorant of Example 3 (1000 ppm) and ethylene glycol (3 g). This blend is vacuum dried in an oven at 110° C. for 16 hours. A 15 mil thick film extruded on a C. W. Brabender ¾ in. extruder at 280° C. has a maximum absorbance in the visible absorption at about 440 nm and has excellent clarity.

EXAMPLE 9

Polypropylene (Eastman Tenite 4235) (300 g) which has been granulated on a Wiley Mill using a 2 mm screen is dry blended with 1000 ppm (0.30 g) of polymeric yellow colorant of Example 3. The sample is extruded on a C. W. Brabender ¾ in. extruder at 240° C. to product a 15 mil film which has a reddish yellow color.

The present invention is further illustrated by the examples of Tables I-II.

TABLE I

| Ex. No. | A | R₄ | R₅ | R₆ |
|---|---|---|---|---|
| 10 | —O₂C—C(CN)= | H | C₂H₅ | —CH₂CH₂— |
| 11 | —O₂C—C(CN)= | 3-OCH₃ | C₄H₉-n | —CH₂CH₂CH₂— |
| 12 | —O₂C—C(CN)= | 2,5-di-OCH₃ | CH₃ | —CH₂CH₂OCH₂CH₂— |
| 13 | —O₂C—C(CN)= | 2,5-di-OC₂H₅ | CH₂CH(CH₃)₂ | —CH₂CH₂OCH₂CH₂— |
| 14 | —O₂C—C(CN)= | 2-OCH₃, 5-CH₃ | CH₂CH(C₂H₅)C₄H₉-n | —CH₂CH(CH₃)— |
| 15 | —O₂C—C(CN)= | 3-Cl | C₂H₅ | —CH₂CH(C₆H₅)— |
| 16 | —O₂C—C(CN)= | 3-CH₃ | C₆H₁₁ | —CH₂CH₂— |
| 17 | —O₂C—C(CN)= | H | CH₂C₆H₅ | —CH₂CH₂SCH₂CH₂— |
| 18 | —O₂C—C(CN)= | H | CH₂C₆H₄-p-CH₃ | —CH₂CH₂N(SO₂CH₃)CH₂CH₂— |
| 19 | —O₂C—C(CN)= | H | CH₂C₆H₄-o-Cl | —CH₂CH₂N(SO₂C₆H₅)CH₂CH₂— |
| 20 | —O₂C—C(CN)= | H | CH₂C₆H₄-p-CO₂CH₃ | —CH₂SO₂CH₂CH₂— |
| 21 | —O₂C—C(CN)= | H | CH₂C₆H₄-m-OCH₃ | —CH₂C₆H₁₀-p-CH₂— |
| 22 | —O₂C—C(CN)= | H | CH₂C₆H₁₁ | —C₆H₁₀-p |
| 23 | —O₂C—C(CN)= | 3-OCH₃ | CH₂CH=CH₂ | —CH₂C₆H₄-p-CH₂ |
| 24 | —O₂C—C(CN)= | 3-C₂H₅ | C₆H₅ | —CH₂CH₂— |
| 25 | —O₂C—C(CN)= | H | C₆H₄-p-OCH₃ | —CH₂CH₂C₆H₄-p |
| 26 | —O₂C—C(CN)= | H | C₆H₅ | —C₆H₄-p— |
| 27 | —O₂C—C(CN)= | 3-CH₃ | C₂H₅ | —CH₂CH₂— |
| 28 | —O₂C—C(CO₂C₂H₅)= | H | C₆H₁₀-p-CH₃ | —CH₂CH(CH₃)— |
| 29 | —O₂C—C(CONH₂)= | H | CH₂CH₂CN | —CH₂CH₂— |
| 30 | —O₂C—C(CONHCH₃)= | H | CH₂CH₂C₆H₅ | —CH₂CH₂— |
| 31 | —O₂C—C(CON(CH₃)₂)= | H | CH₂CH₂Cl | —CH₂CH₂OCH₂CH₂O— |
| 32 | —O₂C—C(CONHC₆H₅)= | H | CH₂CH₂Cl | —CH₂CH₂OCH₂CH₂O— |
| 33 | —O₂C—C(SO₂CH₃)= | H | CH₂CH₂OCH₂CH₂OC₂H₅ | —CH₂CH₂— |
| 34 | —O₂C—C(SO₂C₆H₅)= | H | CH₂CH₂OCOCH₃ | —CH₂CH₂— |
| 35 | —O₂C—C(SO₂C₆H₁₁)= | H | CH₂SCH₃ | —CH₂CH₂OC₆H₄-p-OCH₂CH₂— |

TABLE I-continued

| Ex. No. | A | R$_4$ | R$_5$ | R$_6$ |
|---|---|---|---|---|
| 36 | —O$_2$C—C(C$_6$H$_5$)= | H | —CH$_2$CH$_2$SC$_6$H$_5$ | —CH$_2$CH$_2$SCH$_2$CH$_2$— |
| 37 | —O$_2$C—C(=)—C(=N—)—O— (benzo-fused, para position) | H | —CH$_2$CH$_2$SO$_2$CH$_3$ | —CH$_2$CH$_2$— |
| 38 | —O$_2$C—C(=)—C(=N—)—S— (benzo-fused with CO$_2$CH$_3$) | H | —CH$_2$CH$_2$SO$_2$CH=CH$_2$ | —CH$_2$CH$_2$— |
| 39 | —O$_2$C—C(=)—C(=N—)—S— (benzo-fused with CH$_3$) | -3-CH$_3$ | —CH$_2$CH$_2$SO$_2$C$_6$H$_5$ | —CH$_2$CH$_2$CH$_2$CH$_2$CH$_2$— |
| 40 | —NHCO—C(CN)= | H | —CH$_2$CH$_2$S—C(=N—)—S— (benzo-fused) | —CH$_2$CH$_2$— |
| 41 | —O$_2$S—C(CN)= | H | —CH$_2$CH$_2$S—C(=N—)—O— (benzo-fused) | —CH$_2$CH$_2$— |

TABLE I-continued

| Ex. No. | A | $R_4$ | $R_5$ | $R_6$ |
|---|---|---|---|---|
| 48 | [structure: methyl/CN substituted dioxo ring] | 3-CH$_3$ | —CH$_2$CH$_3$ | —CH$_2$CH$_2$— |
| 49 | [structure: SO$_2$, NC, O$_2$C substituted benzene] | H | —CH$_2$CH$_2$S— [triazole NH/CH/N] | —CH$_2$CH$_2$— |
| 50 | [structure: O$_2$N—C$_6$H$_4$—C(CN)=] | H | —CH$_2$CH$_2$S—C(=N—)—O— [phenyl] | —CH$_2$CH$_2$— |
| 51 | [structure: O$_2$S—C$_6$H$_4$—C(CN)=] | H | —CH$_2$CH$_2$S—C(=N—)—N—H [phenyl] | —CH$_2$CH$_2$— |
| 52 | [structure: CH$_3$SO$_2$N—C$_6$H$_4$—C(CN)=] | H | —CH$_2$CH$_2$SO$_2$CH$_2$CH$_2$—N(C=O)$_2$[phenyl] | —CH$_2$CH$_2$— |

TABLE I-continued

| Ex. No. | A | R4 | R5 | R6 |
|---|---|---|---|---|
| 53 | —N(CH3)O2S—C6H4—C(CN)= | H | —CH2CH2SO2CH2CH2SC6H5 | —CH2CH2— |
| 54 | NC,CN-C(2-SO2-4-O2C-C6H3)= | H | —CH2CH2C6H5 | —CH2CH2— |
| 55 | NC,CN-C(4-O-C6H4)—CH= | H | —C2H5 | —CH2CH2— |
| 56 | barbiturate-N(CH3)- linked | 3-CH3 | —C2H5 | —CH2CH2— |
| 57 | barbiturate-N(C6H5)-N(C2H5)— | H | —CH3 | —CH2CH(CH3)— |
| 58 | NC-furanone-C6H4-O— | 3-Cl | —C6H5 | —CH2CH2— |

TABLE I-continued
| Ex. No. | A | R₄ | R₅ | R₆ |
|---|---|---|---|---|
| 59 | 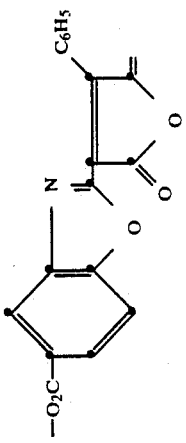 | H | —C₂H₅ | —CH₂CH₂— |
| 60 | 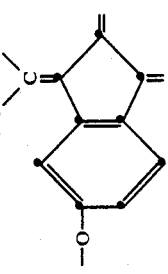 | H | —C₆H₁₁ | —CH₂CH₂— |
| 61 | 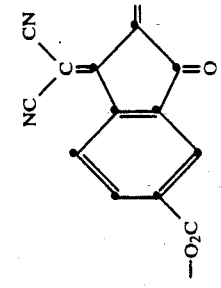 | 3-OCH₃ | —C₆H₅ | —CH₂CH₂— |

TABLE II $$\mathrm{+A{=}HC{-}B\mathrm{+}_n}$$

| Ex. No. | A | B |
|---|---|---|
| 62 | $-O_2C-C(CN)=$ | |
| 63 | $-O_2C-C(CN)=$ | |
| 64 | $-O_2C-C(CN)=$ | |
| 65 | $-O_2C-C(SO_2C_6H_5)=$ | |
| 66 | | |
| 67 | | |
| 68 | $-O_2C-C(CN)=$ | |
| 69 | $-O_2C-C(CN)=$ | |

TABLE II-continued
| Ex. No. | A | B |
|---|---|---|
| 70 | —O$_2$C—C(CN)= | 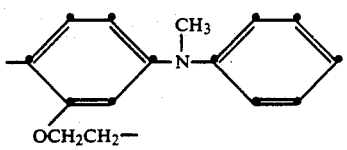 |
| 71 | 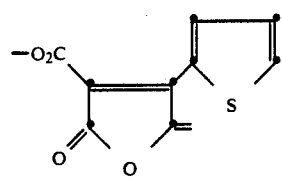 | 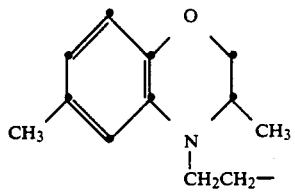 |
| 72 | 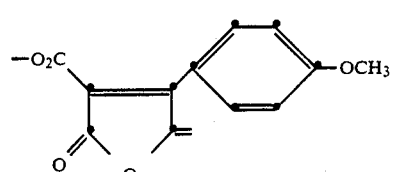 | 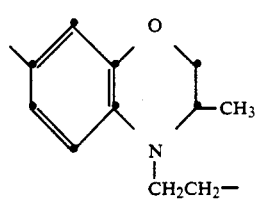 |
| 73 | —O$_2$C—C(CN)= | 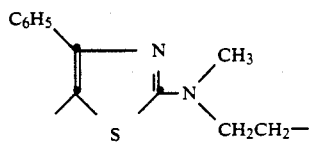 |
| 74 | —O$_2$C—C(SO$_2$CH$_3$)= | 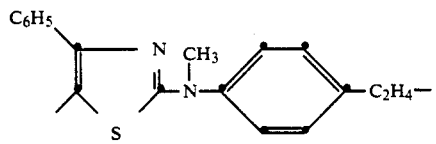 |
| 75 | —O$_2$C—C(CN)= | 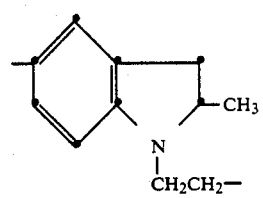 |
| 76 | 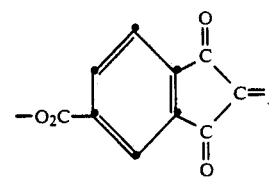 | 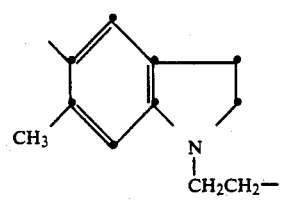 |
| 77 | 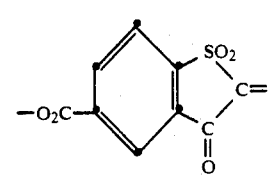 | 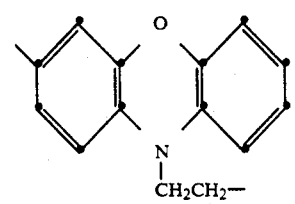 |

TABLE II-continued $+A=HC-B)_n$

| Ex. No. | A | B |
|---|---|---|
| 78 | $-O_2C-C(CONHC_6H_5)=$ | (2,2'-disubstituted carbazole-N-CH₂CH₂–) |
| 79 | $-O_2C-C(CN)=$ | (phenyl-O-(CH₂)₆–) |
| 80 | $-O_2C-C(CO_2C_2H_5)=$ | (phenyl-OCH₂CH₂–) |
| 81 | $-O_2C-C\{=N-C_6H_3(CH_3)-O-\}=$ | (methoxy-phenyl-OCH₂CH₂–) |
| 82 | (3,3-dimethyl-1-methyl-indolenine-2-ylidene carboxylate, I⁻) | (2,6-disubstituted phenyl, N(CH(CH₃)₂)CH₂CH₂–) |
| 83 | $-O_2C-C(CN)=$ | (2,6-dimethylphenyl with C(CH₃)₂-CH=, N-CH₃) |
| 84 | $-O_2C-C(CN)=$ | (naphthyl-N(C₂H₅)C₂H₄–) |
| 85 | $-O_2C-C(CN)=$ | (naphthyl-OCH₂CH₂–) |

TABLE II-continued

| Ex. No. | A | $(-A=HC-B)_n$ B |
|---|---|---|
| 86 | $-O_2C-C(CN)=$ | 1,1,4-trimethyl-1,2,3,4-tetrahydroquinoline (2,2,4-trimethyl-tetrahydroquinolinyl group with CH₃, CH₃, CH₃ substituents) |
| 87 | $-O_2C-C(CN)=$ | 2-methyl-4-methyl-tetrahydroquinoline with O-CH₂ bridge |
| 88 | $-O_2C-C(CN)=$ | julolidinyl-type tetrahydroquinoline |
| 89 | $-O_2C-C(CN)=$ | coumarin with 2-methyl and 7-OC₂H₄— substituent |
| 90 | $-O_2C-C(CN)=$ | coumarin with 2-methyl and 7-N(C₂H₅)(C₂H₄—) substituent |
| 91 | $-O_2C-(CN)=$ | 2,3-dimethyl-1-(CH₂CH₂—)indole |
| 92 | $-O_2C-(CN)=$ | 3-methyl-1-(CH₂CH₂—)-5-oxo-pyrazoline |
| 93 | $-O_2C(CN)=$ | 4-OCH₃, 3-OCH₂CH₂— phenyl |

TABLE II-continued

| Ex. No. | A | $+A=HC-B+_n$ B |
|---|---|---|
| 94 | —O$_2$C(CN)= | (phenyl with OCH$_2$CH$_2$—) |
| 95 | —O$_2$C(CN)= | (phenyl with N(C$_2$H$_5$)$_2$ and OCH$_2$CH$_2$—) |
| 96 | —O$_2$C(CN)= | (pyridine ring with (CH$_3$)$_2$N, N(C$_2$H$_5$)(C$_2$H$_4$—), CH$_3$, CN) |
| 97 | —O$_2$C(CN)= | (pyridine ring with (C$_2$H$_5$)N, CH$_3$, CN, N(C$_2$H$_5$)C$_2$H$_4$—) |
| 98 | —O$_2$C(CN)= | (pyridine ring with N(CH$_3$)CH$_2$CH$_2$—, CH$_3$, CN, N(CH$_2$CH$_3$)$_2$) |

We claim:

1. A light absorbing thermoplastic polymer composition, which comprises a thermoplastic polymer, said thermoplastic polymer selected from the group consisting of polyesters, polyvinyl chloride, polyvinylidene chloride, polyurethanes, polycarbonates, cellulose esters, polyacrylates, polyvinylesters, and polyesteramides, blended with a light absorbing polymer represented by Formula (I)

—(A=HC—B—)$_n$—  (I)

wherein active methylene residues (A) are selected from the formulae:

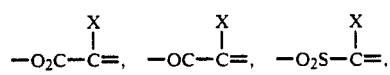

-continued

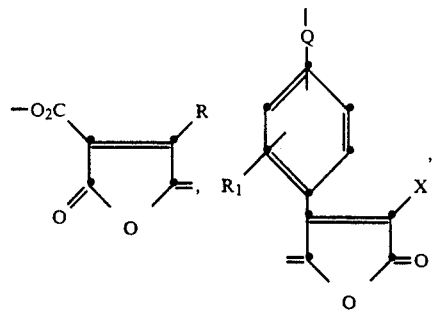

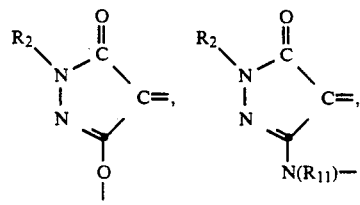

-continued

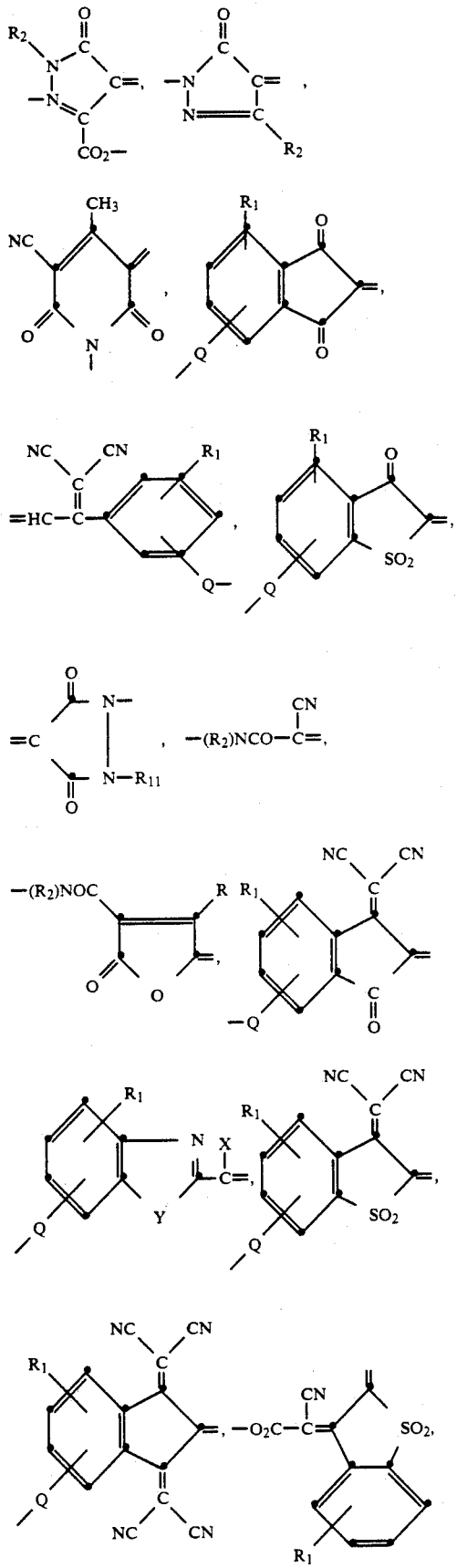

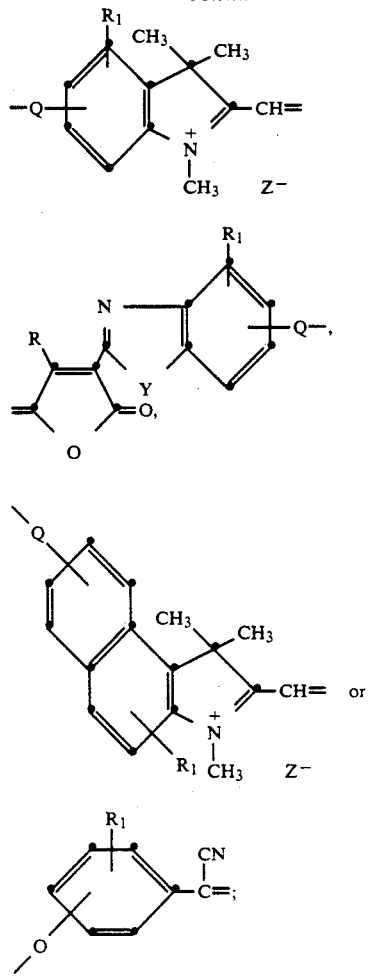

wherein Q is selected from a group consisting of a covalent bond, —CO$_2$—, —CO—, —S—, —O—, —SO$_2$—, —CON(R$_2$)—, —N(SO$_2$R$_3$)— and —SO$_2$N(R$_2$)—;

X is selected from a group consisting of cyano; a phenyloxycarbonyl group optionally substituted with halo, C$_1$-C$_6$ alkoxy, C$_3$-C$_8$ cycloalkyl, phenyl, phenoxy, cyano, C$_1$-C$_6$ alkanoyloxy, hydroxy, and C$_1$-C$_6$ alkoxycarbonyl; C$_1$-C$_9$ alkylaminocarbonyl; C$_1$-C$_{12}$ alkylsulfonyl; C$_3$-C$_8$ cycloalkylsulfonyl; and an aryl group selected from the group consisting of phenyl, naphthyl, phenanthyryl, thienyl, furyl, pyrrolyl, imidazolyl, pyrazolyl, thiazolyl, isothiazolyl, oxazolyl, isoxazolyl, triazolyl, thiadiazolyl, oxadiazolyl, tetrazolyl, thiatrizolyl, oxatrizolyl, pyridyl, pyrimidyl, pyrazinyl, pyridizinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, purinyl, benzoxazolyl, benzothiazolyl, benzimidazolyl, and indolyl; and said aryl groups substituted once with a group selected from the group consisting of halo, phenoxy, phenyl, hydroxy, amino, C$_1$-C$_6$ alkoxycarbonyl, nitro, carboxy, cyano, C$_1$-C$_6$ alkylsulfonyl, and C$_1$-C$_6$ alkoxy;

Y is selected from the group consisting of —O—, —S—, —NH— and an imino group substituted once with a group selected from the group consisting of hydrogen, $C_1$-$C_6$ alkyl, $C_3$-$C_8$ cycloalkyl, and an aryl group selected from the group consisting of phenyl, naphthyl, phenanthyryl, thienyl, furyl, pyrrolyl, imidazolyl, pyrazolyl, thiazolyl, isothiazolyl, oxazolyl, isoxazolyl, triazolyl, thiadizolyl, oxadiazolyl, tetrazolyl, thiatrizolyl, oxatrizolyl, pyridyl, pyrimidyl, pyrazinyl, pyridizinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, purinyl, benzoxazolyl, benzothiazolyl, benzimidazolyl, and indolyl;

$Z^-$ is a counter anion;

R is hydrogen, $C_1$-$C_6$ alkyl, or an aryl group selected from the group consisting of phenyl, napthyl, phenanthyryl, thienyl, furyl, pyrrolyl, imidazolyl, pyrazolyl, thiazolyl, isothiazolyl, oxazolyl, isoxazolyl, triazolyl, thiadizolyl, oxadiazolyl, tetrazolyl, thiatrizolyl, oxatrizolyl, pyridyl, pyrimidyl, pyrazinyl, pyridizinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, purinyl, benzoxazolyl, benzothiazolyl, benzimidazolyl, and indolyl; and said aryl groups substituted once with a group selected from the group consisting of halo, phenoxy, phenyl, hydroxy, amino, $C_1$-$C_6$ alkoxycarbonyl, nitro, carboxy, cyano, $C_1$-$C_6$ alkylsulfonyl, and $C_1$-$C_6$ alkoxy;

$R_1$ is hydrogen, $C_1$-$C_6$ alkyl, $C_1$-$C_6$ alkoxy or halogen;

$R_2$ is selected from the group consisting of hydrogen; $C_1$-$C_6$ alkyl; $C_1$-$C_6$ alkyl substituted by a group selected from the group consisting of halo, phenyl, phenoxy, $C_1$-$C_4$ alkanoyloxy, hydroxy, amino, $C_1$-$C_6$ alkoxycarbonyl, nitro, carboxy $C_1$-$C_6$ alkylsulfonyl, cyclohexyl, carbamoyl, cyano, $C_1$-$C_6$ alkylsulfonyl, and $C_1$-$C_6$ alkoxy; $C_3$-$C_8$ cycloalkyl; or an aryl group selected from the list consisting of phenyl, napthyl, phenanthyryl, thienyl, furyl, pyrrolyl, imidazolyl, pyrazolyl, thiazolyl, isothiazolyl, oxazolyl, isoxazolyl, triazolyl, thiadizolyl, oxadiazolyl, tetrazolyl, thiatrizolyl, oxatrizolyl, pyridyl, pyrimidyl, pyrazinyl, pyridizinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, purinyl, benzoxazolyl, benzothiazolyl, benzimidazolyl, and indolyl; and said aryl groups substituted once with a group selected from the group consisting of halo, phenoxy, phenyl, hydroxy, amino, $C_1$-$C_6$ alkoxycarbonyl, nitro, carboxy, cyano, $C_1$-$C_6$ alkylsulfonyl, and $C_1$-$C_6$ alkoxy;

$R_3$ is $C_1$-$C_6$ alkyl, optionally substituted by one or more groups selected from the group consisting of halo, phenoxy, $C_1$-$C_4$ alkanoyloxy, hydroxy, amino, $C_1$-$C_6$ alkoxycarbonyl, nitro, carboxy, $C_1$-$C_6$ alkylsulfonyl, cyclohexyl, carbamoyl, cyano, $C_1$-$C_6$ alkylsulfonylamino, and $C_1$-$C_6$ alkoxy; $C_3$-$C_8$ cycloalkyl; an aryl group selected from the group consisting of phenyl, napthyl, phenanthyryl, thienyl, furyl, pyrrolyl, imidazolyl, pyrazolyl, thiazolyl, isothiazolyl, oxazolyl, isoxazolyl, triazolyl, thiadizolyl, oxadiazolyl, tetrazolyl, thiatrizolyl, oxatrizolyl, pyridyl, pyrimidyl, pyrazinyl, pyridizinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, purinyl, benzoxazolyl, benzothiazolyl, benzimidazolyl, and indolyl; wherein the divalent moiety B is represented by one of the following formulae:

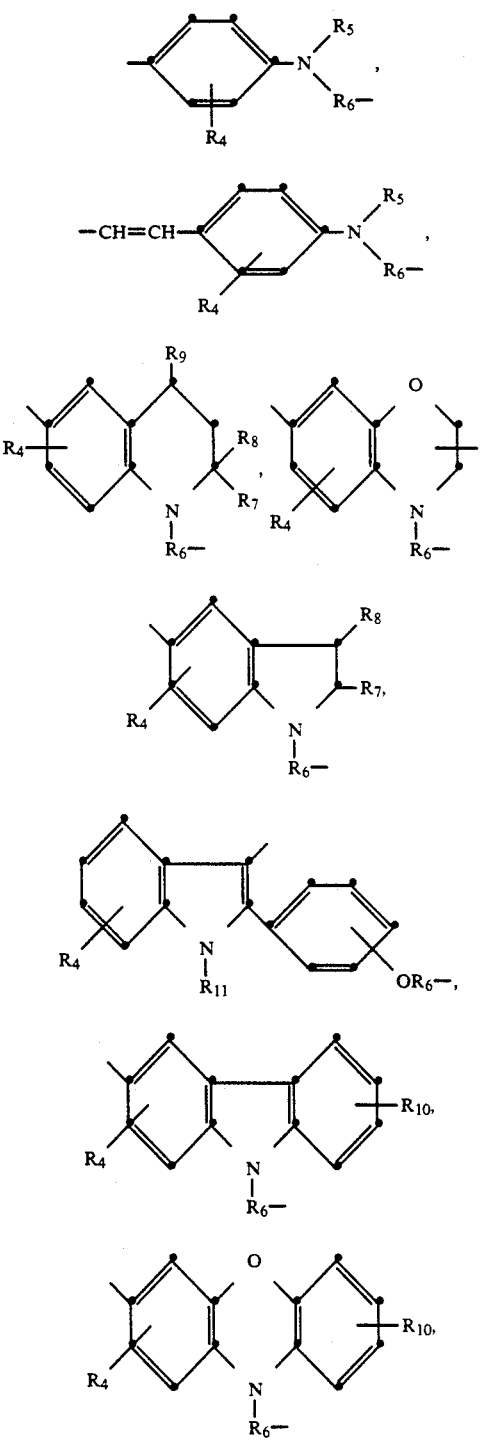

-continued

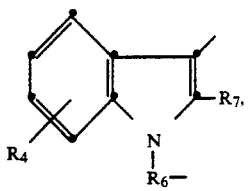

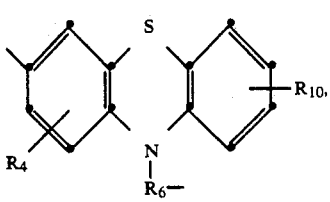

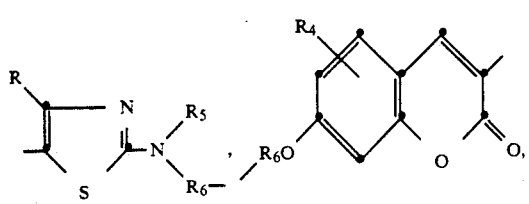

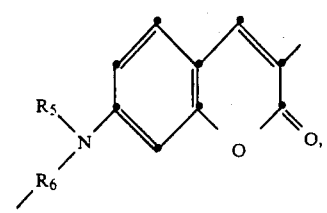

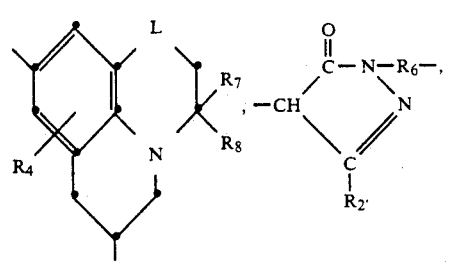

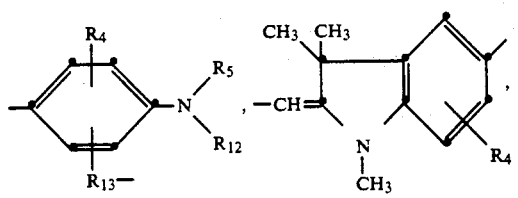

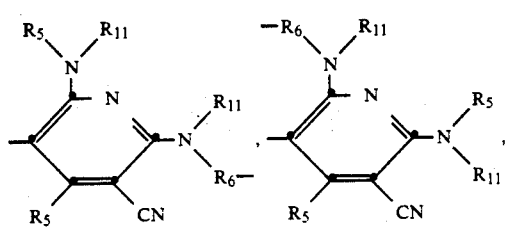

-continued

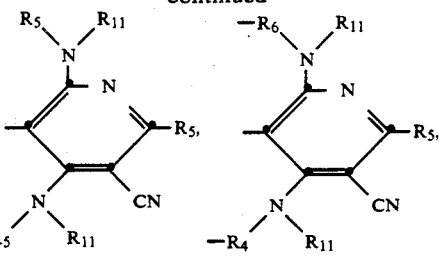

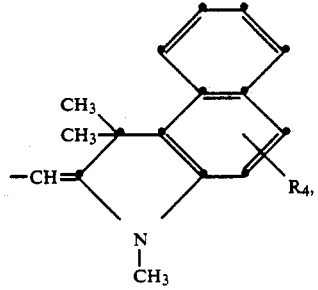

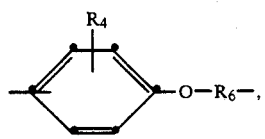

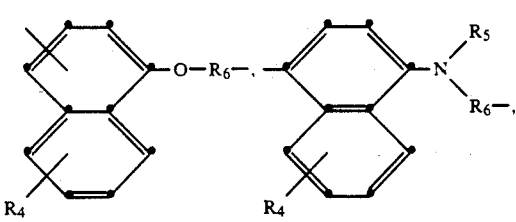

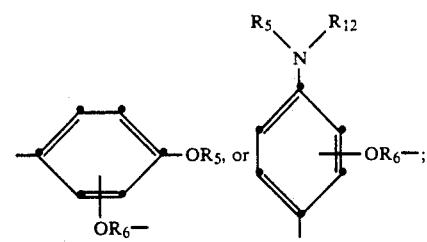

wherein
$R_4$ and $R_{10}$ are hydrogen or 1-2 substituents selected from $C_1-C_6$ alkyl, $C_1-C_6$ alkoxy or halogen;

$R_5$ and $R_{12}$ are selected from unsubstituted $C_1-C_6$ alkyl; $C_3-C_6$ alkenyl; $C_3-C_8$ cycloalkyl; phenyl; $C_1-C_6$ alkyl substituted by one or more groups selected from the group consisting of halo, phenyl, phenoxy, $C_1-C_4$ alkanoyloxy, hydroxy, amino, $C_1-C_6$ alkoxycarbonyl, nitro, carboxy $C_1-C_6$ alkylsulfonyl, cyclohexyl, carbamoyl, cyano, $C_1-C_6$ alkylsulfonyl, and $C_1-C_6$ alkoxy; $C_3-C_8$ cycloalkyl; and phenyl;

$R_6$ is selected from the group consisting of $C_1-C_6$ alkylene, $C_3-C_8$ cycloalkylene, phenylene, $C_1-C_{12}$ alkylenephenylene $C_1-C_{12}$ alkylene, $C_1-C_{12}$ alkylene-$(C_3-C_8)$cycloalkylene-$C_1-C_{12}$ alkylene, $C_1-C_{12}$ alkylene—O—$C_1-C_{12}$ alkylene, $C_1-C_{12}$ alkylene—S—$C_1-C_{12}$ alkylene, $C_1-C_{12}$ alkylene—SO$_2$—$C_1-C_{12}$ alkylene, $C_1-C_{12}$ alkylene—O—phenylene—O—C$_1$-C$_{12}$ alkylene, C$_1$-C$_{12}$ alkylene—N(SO$_2$R$_3$)C$_1$-C$_{12}$ alkylene, and C$_1$-C$_{12}$ alkylene-phenylene;

R$_7$, R$_8$, and R$_9$ are hydrogen or C$_1$-C$_{12}$ alkyl;

R$_{11}$ is hydrogen, C$_1$-C$_6$ alkyl or an aryl group selected from the group consisting of phenyl, napthyl, phenanthyryl, thienyl, furyl, pyrrolyl, imidazolyl, pyrazolyl, thiazolyl, isothiazolyl, oxazolyl, isoxazolyl, triazolyl, thiadizolyl, oxadiazolyl, tetrazolyl, thiatrizolyl, oxatrizolyl, pyridyl, pyrimidyl, pyrazinyl, pyridizinyl, thiazinyl, oxazinyl, triazinyl, thiadiazinyl, oxadiazinyl, dithiazinyl, dioxazinyl, oxathiazinyl, tetrazinyl, thiatriazinyl, oxatriazinyl, dithiadiazinyl, imidazolinyl, dihydropyrimidyl, tetrahydropyrimidyl, tetrazolo, purinyl, benzoxazolyl, benzothiazolyl, benzimidazolyl, and indolyl;

R$_{13}$ is selected from C$_1$-C$_6$ alkylene, —O—R$_6$— or N(SO$_2$R$_3$)—R$_6$—;

L is selected from the group consisting of a direct bond, —O—, —CH$_2$— and —CH(CH$_3$)—; and n is an integer of from about 2 to about 40.

2. The light-absorbing thermoplastic polymer composition of claim 1, wherein the thermoplastic polymer is a polyurethane.

3. The light-absorbing thermoplastic polymer composition of claim 1, wherein the thermoplastic polymer is polyvinyl chloride.

4. The light-absorbing thermoplastic polymer composition of claim 1, wherein the thermoplastic polymer is polyvinylidene chloride.

5. The light-absorbing thermoplastic polymer composition of claim 1, wherein the thermoplastic polymer is a polycarbonate.

6. The light-absorbing thermoplastic polymer composition of claim 1, wherein the thermoplastic polymer is a polyester.

7. The light-absorbing thermoplastic polymer composition of claim 1, wherein the thermoplastic polymer is a polyacrylate.

8. The light-absorbing thermoplastic polymer composition of claim 1, wherein the thermoplastic polymer is a polyester-amide.

9. The light-absorbing thermoplastic polymer composition of claim 1, wherein the thermoplastic polymer is a blend of a polyester and a polycarbonate.

* * * * *